July 30, 1963    S. D. SILLIMAN ETAL    3,099,724
MONITOR SYSTEM FOR CIRCUIT INTERRUPTERS
Filed Dec. 7, 1960    3 Sheets-Sheet 1

WITNESSES

INVENTORS
Sheldon D. Silliman &
Bernard R. Johnson
BY
Willard R. Crout
ATTORNEY

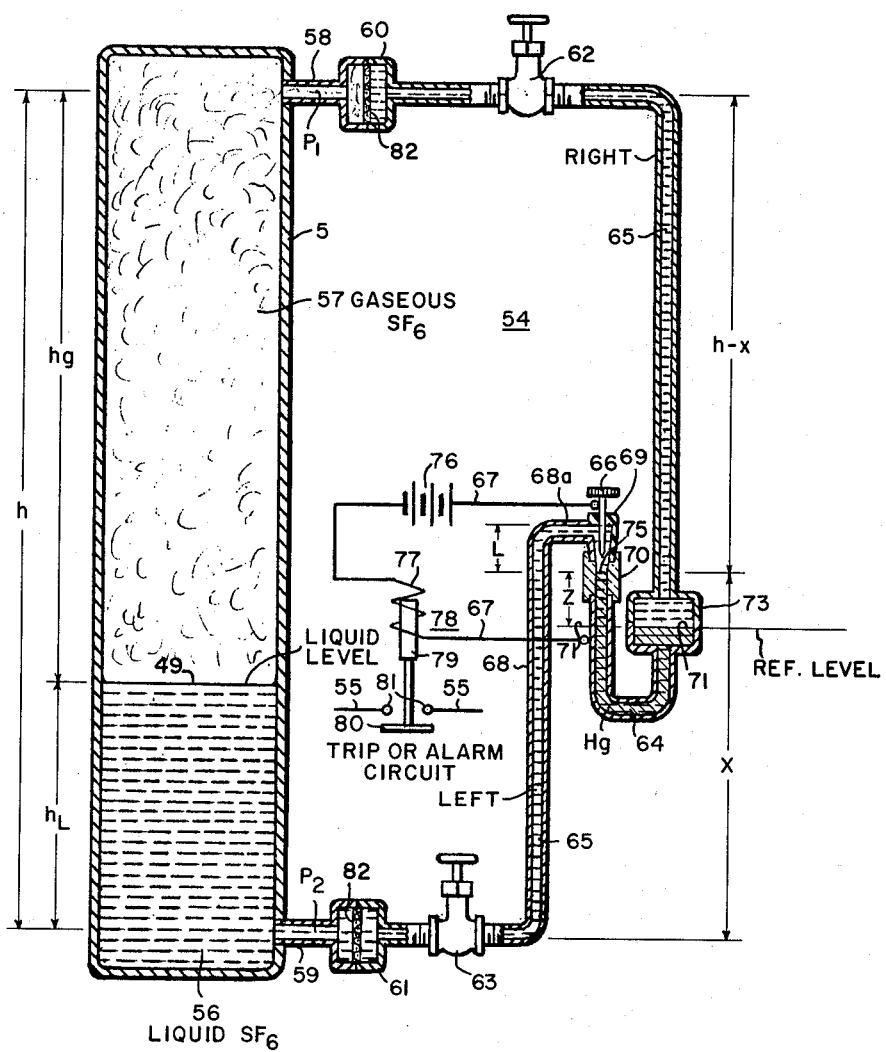

United States Patent Office 3,099,724
Patented July 30, 1963

3,099,724
MONITOR SYSTEM FOR CIRCUIT INTERRUPTERS
Sheldon D. Silliman, Forest Hills, Pa., and Bernard R. Johnson, Riverdale, N. Dak., assignors to Westinghouse Electric Corporation, East Pittsburgh, Pa., a corporation of Pennsylvania
Filed Dec. 7, 1960, Ser. No. 74,387
4 Claims. (Cl. 200—81.6)

This invention relates to monitor systems for circuit interrupters and, more particularly, to monitor systems for breakers having an arc-extinguishing fluid in both the liquid and gaseous phases.

In United States patent application filed January 13, 1959, by Winthrop M. Leeds and Harry J. Lingal, Serial No. 786,587, now U.S. Patent 3,071,669, issued January 1, 1963, and assigned to the assignee of the instant application, there is disclosed and claimed a circuit interrupter of the type using an arc-extinguishing fluid in both the liquid and gaseous phases. In the particular interrupting structure disclosed in the aforesaid application, the arc-extinguishing medium was sulfur hexafluoride ($SF_6$). This medium was both in the liquid phase and also in the gaseous phase, considerable pressure being required to maintain the sulfur hexafluoride in the liquid phase.

For the particular rating of the circuit interrupter set forth in the aforesaid patent application, it is necessary to have the sulfur hexafluoride in the liquid phase to take advantage of the remarkable arc-extinguishing properties while the sulfur hexafluoride is in the liquid phase. Because of the pressure and the use of seals, there is always the hazard of leakage. Such leakage, if allowed to occur unattended, results in a loss of the important arc-extinguishing fluid for the circuit interrupter, and the situation may arise that the circuit interrupter will be called upon to open the connected circuit without possessing the proper quantity of arc-extinguishing medium at the proper pressure. To avoid this possibility, it is desirable to provide a monitor system to detect any leakage of the arc-extinguishing fluid. Accordingly, it is a general purpose of the present invention to provide an improved monitor system, which will detect such leakage, if it occurs, and either to trip the breaker open before the danger point has been reached, or else to initiate an alarm circuit to call the attention of the station attendant to the unsatisfactory condition of the breaker.

Still a further object of the present invention is to provide an improved manometer-type system to detect loss of arc-extinguishing fluid in a circuit-interrupting structure.

A further object of the present invention is to provide an improved differential-type manometer system in which an adjustable probe may be provided to obtain an adjustment to vary the conditions at which the tripping circuit will be initiated.

Still a further object of the present invention is to provided a cheap and highly efficient leakage-detecting system for insuring proper operation on of the circuit interrupter and avoidance of the situation, where the breaker is called upon to interrupt its connected circuit without the requisite amount of arc-extinguishing fluid under the proper pressure.

Further objects and advantages will readily become apparent upon reading the following specification, taken in conjunction with the drawings, in which.

Figure 1:
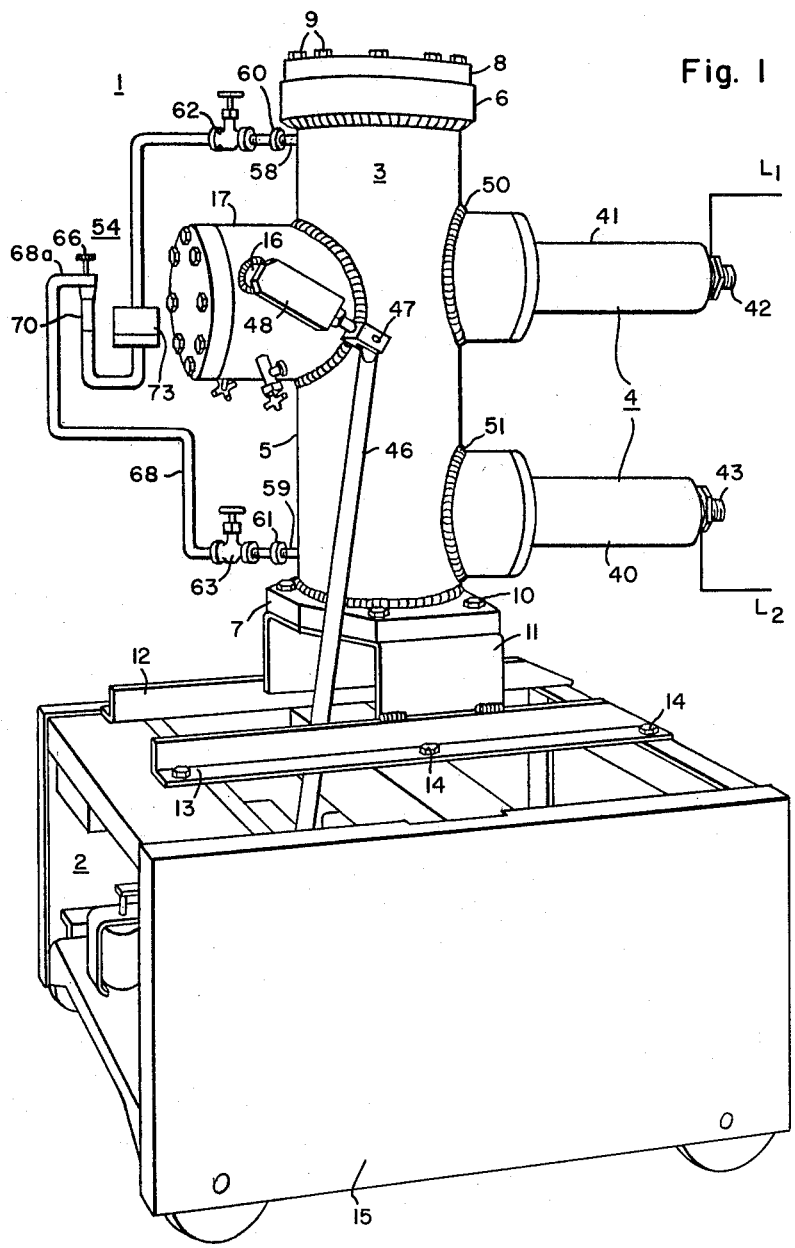
FIGURE 1 is a perspective view of a circuit-interrupting structure embodying features of the present invention with the breaker shown in the closed-circuit position.

Referring to the drawings, and more particularly to FIG. 1 thereof, the reference numeral 1 generally designates a circuit-interrupting structure including an operating mechanism 2, an interrupting structure 3 and bushing means 4 for connecting the circuit interrupter 1 to the connected circuit $L_1L_2$. The circuit-interrupting structure 1 is set out in considerable detail in the aforesaid patent application of Leeds and Lingal, and since the present invention is only concerned with a monitor system for the circuit interrupter 1, only a relatively brief description of the method of circuit interruption will be given. For a more detailed and minute description of the breaker operation, and the theory of interruption, reference may be had to the aforesaid Leeds and Lingal patent application.

Figure 2:
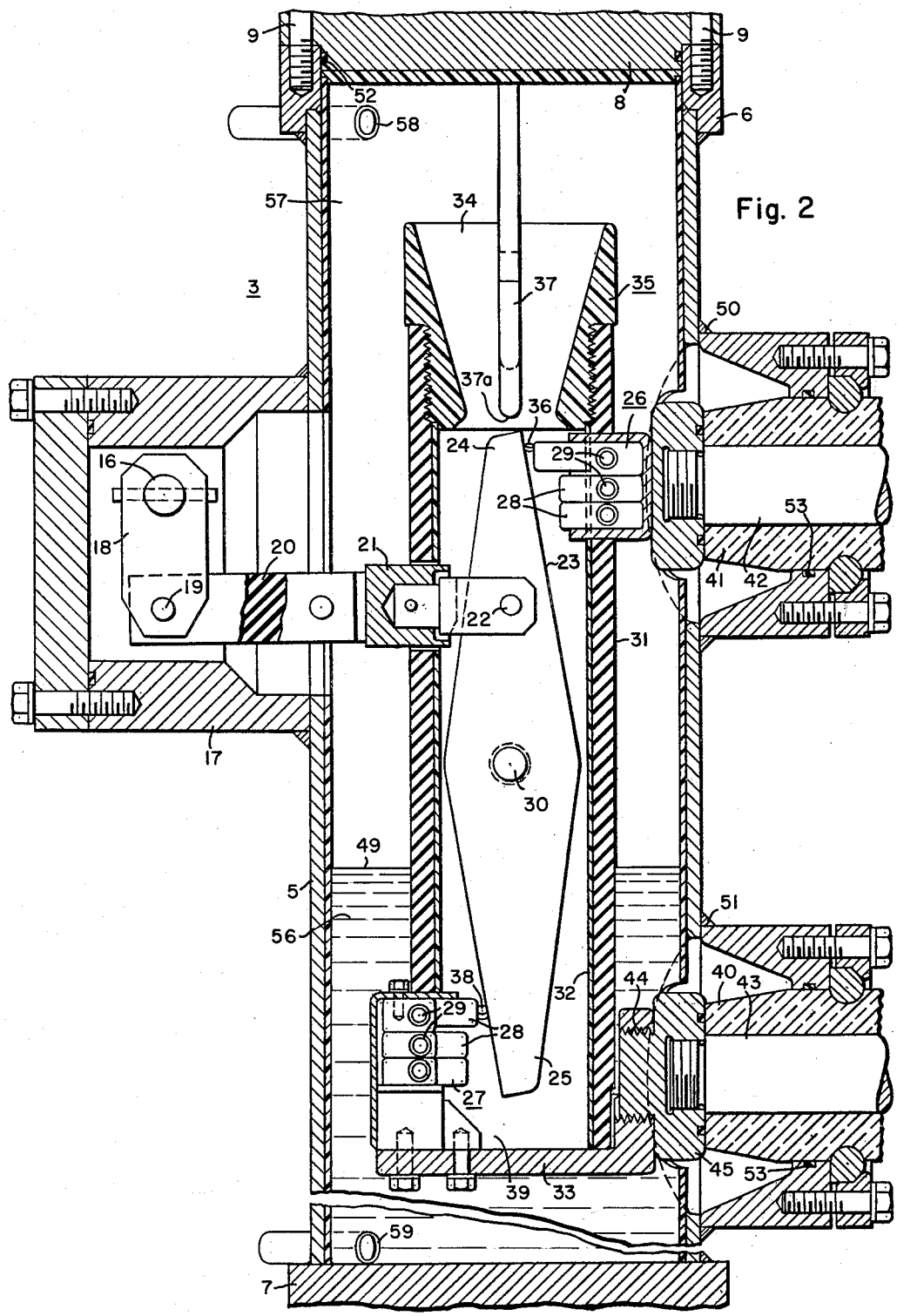
FIG. 2 is an enlarged vertical sectional view taken through the interrupting structure of the circuit interrupter illustrated in FIG. 1, the contact structure being illustrated at an intermediate point in the opening operation; and, FIG. 3 is a somewhat diagrammatic view of the manometer-type monitoring system of the present invention illustrating the associated tripping circuit.

Referring to FIG. 2 of the drawings, which illustrates in more detail the internal interrupting structure 3 of the circuit interrupter 1, it will be observed that there is provided a tubular grounded metallic casing 5 having welded thereto at the opposite ends thereof, flange rings 6, 7. The upper flange ring 6 has bolted thereto an upper metallic closure plate 8 by means of bolts 9. As shown in Fig. 1, the lower flange ring 7 is secured by bolts 10 to a generally U-shaped bracket 11 which, in turn, is welded to angle members 12, 13. The angle members 12, 13 af secured by bolts 14 to the top of the the mechanism compartment 15 enclosing the operating mechanism 2 of the circuit interrupter 1.

As shown in FIG. 1, a crank-shaft 16 extends laterally through a boss portion 17, and serves to rotate an internally-disposed crank-arm 18. The free end of the crank-arm 18 is pivotally connected, as at 19, to an insulating operating rod 20. The insulating operating rod 20 has a metallic rod-end 21, which is pivotally connected, as at 22, to a rotatable bridging blade 23. The opposite ends 24, 25 of the bridging blade 23 make electrical contact with relatively stationary contact structures 26, 27 in the closed-circuit position of the interrupter.

As shown in FIG. 2, the relatively stationary contact structures 26, 27 comprise a plurality of contact fingers 28 biased inwardly by compression springs 29, as well known by those skilled in the art. The compression springs 29 serve to provide the requisite contact pressure in the closed-circuit position of the interrupter 1.

As shown in FIG. 2, the bridging blade 23 is pivotally mounted upon a stationary pivot pin 30, which is journaled in diametrically oppositely disposed holes provided in an upstanding interrupting tube 31. The interrupting tube 31 is preferably formed from a suitable insulating material, and may have an internal cylindrical liner 32. A lower closure plate 33 closes the lower end of the interrupting tube 31 and forces any fluid, under pressure, to be ejected out of the upper open end 34 of the interrupting tube 31. An orifice structure 35 is provided at the upper end 34 of the tube 31 to concentrate the ejected fluid blast past the interrupting arc 36, which is drawn between the movable contact 24 and the upper relatively stationary contact structure 26.

To assist in interrupting the interrupting arc 36, preferably a notched splitter plate 37 is employed to permit the arc 36 to be moved around opposite sides of the lower notched end 37a of the splitter plate 37. This speeds up the interrupting operation.

As shown in FIG. 2, to generate the required pressure within the interrupting tube 31, a pressure-generating arc 38 is established adjacent the lower interior end 39 of the tube 31 between the movable contact 25 and the lower relatively stationary contact structure 27. The pressure-generating arc 38 generates pressure interiorly of the tube 31 adjacent the lower end thereof, and forces the fluid, under pressure, upwardly out of the open upper end 34 of the tube 31 effecting thereby rapid extinction of the interrupting arc 36.

To secure the interrupting tube 31 into a fixed proper position, the terminal bushings 40, 41 are provided, collectively constituting the bushing means 4 illustrated in FIG. 1. The terminal bushings 40, 41 serve to connect the circuit $L_1 L_2$ through terminal studs 42, 43 to the relatively stationary contact structures 26, 27 respectively. It will be obvious, therefore, that in the closed-circuit position of the interrupter as illustrated in FIG. 1, the electrical circuit therethrough includes upper terminal stud 42, upper relatively stationary contact structure 26, fingers 28 thereof to the upper movable contact portion 24 of the rotatable blade 23. The circuit then extends through the rotatable conducting blade 23 to the lower movable portion 25 thereof, and through the lower fingers 28 of lower relatively stationary contact structure 27 to the lower conducting closure-plate portion 33, which makes a threaded connection, as at 44, to the interior end 45 of the lower terminal bushing 40. The circuit then extends through the lower terminal stud 43 to the external circuit $L_2$.

As set forth more in detail in the aforesaid patent application of Leeds and Lingal, the operating mechanism 2, disposed interiorly within mechanism compartment 15, is effective to move the operating rod 46 (FIG. 1) downwardly. Since the upper end of the operating rod 46 is pivotally connected, as at 47, to the external crank-arm 48, the crank-shaft 16 will be rotated in a clockwise direction, as viewed in FIG. 1.

The opening clockwise rotation of the crank-shaft 16 will effect, through the linkage 18, 20, corresponding counterclockwise rotation of the conducting bridging blade 23. This will cause a separation between the opposite ends 24, 25 of the bridging plate 23 to effect the drawing of a pressure-generating arc 38 at the lower end of the interrupting tube 31 and an interrupting arc 36 adjacent the open upper end 34 thereof.

Since the lower pressure-generating arc 38 is drawn within the liquefied sulfur hexafluoride ($SF_6$), this liquid is gasified, and put under a tremendous pressure. The liquefied sulfur hexafluoride ($SF_6$) is ejected upwardly toward the upper open end 34 of the interrupting tube 31, and causes the upper interrupting arc 36 to stretch around the lower end 37a of the splitter plate 37 quickly effecting its extinction. Following extinction of the interrupting arc 36, the connected circuit $L_1 L_2$ will obviously be interrupted, and continued counterclockwise rotation of the conducting bridging plate 23 will effect two isolating gaps into the circuit. These isolating gaps, of course, are between the ends 24, 25 of the rotatable conducting blade 23 and the relatively stationary contact structures 26, 27.

To effect the closing operation of the circuit interrupter 1, the mechanism 2 is effective to cause upward movement of the externally-situated operating rod 46. Through the crank-arm 48, and the internal linkage 18, 20 the bridging blade 23 is rotated in a clockwise direction about its fixed pivot 30. This will cause reconnection between the movable contacts 24, 25 and the relatively stationary contact structures 26, 27 to thereby complete the circuit through the interrupter 1.

For the particular rating associated with the circuit interrupter 1, it is essential to maintain the presence of a considerable portion of the sulfur hexafluoride ($SF_6$) in the liquid phase. This is indicated by the liquid level 49 of FIGS. 2 and 3 of the drawings. It is to be noted that there are welded joints, as at 50, 51, and seals, as at 52, 53 (FIG. 2). Should these seals leak and thereby permit the pressure to drop within the circuit interrupter 1, it might not be able to interrupt its rated voltage and current. Accordingly, it is desirable to provide a monitoring system, generally designated by the reference numeral 54, to insure that the breaker 1 will maintain its requisite quantity and pressure of liquid and gas. If, for any reason, such pressure is lost, a tripping circuit 55 will be completed to either trip the breaker 1 open before the danger limit is reached, or else to initiate an alarm circuit to bring the station attendant to the breaker site, and acquaint him with the hazardous situation existing.

It will be noted that the sulfur hexafluoride ($SF_6$) is in both a liquid phase 56 and a gaseous phase 57. On the assumption that the cross-sectional area of the casing 5 does not greatly vary, a manometer-type system can measure the differential pressure to the height of the combined liquid and gaseous $SF_6$ between the top and bottom of the breaker tank 5. FIG. 3 shows the basic arrangement. At the breaker tank 5, connections 58, 59 are provided, leading to partition means constituting two diaphragm units 60, 61. The diaphragm units 60, 61 include resilient diaphragm members 82 composed of a suitable resilient material, such as neoprene, or the like. The diaphragm units 60, 61 prevent the sulfur hexafluoride ($SF_6$) gas and liquid, and metallic fluoride particles from entering the manometer system 54. Valves 62, 63 are provided adjacent to the diaphragm units 60, 61, respectively, for servicing and for throttling pressure surges during fault interruption. The manometer uses mercury 64 for its electrical conducting property, and preferably an insulating and inexpensive control liquid, such as oil 65 for its electrical insulating property. A threaded probe 66 provides adjustment with relation to the mercury 64 in establishing continuity for an external relay circuit 67 when the loss of sulfur hexafluoride ($SF_6$) occurs. The manometer tube 68 is preferably of metal, and the probe 66 can be insulated from the metallic tube 68 by means of an insulating section, or insulating threaded bushing 69. The tubing near the mercury 64 can be windowed, to provide a visual adjustment of the probe 66. For this purpose, a section of glass tubing 70 is provided, as shown more clearly in FIG. 3 of the drawings.

With reference to FIG. 3 of the drawings, the pressure acting on the right-hand side of the manometer system 54 on the mercury surface at the reference point 71 is equal to $$S_0(h-x)+S_0\frac{Z}{12} \qquad (1)$$

where: (1)

$S_0$ is equal to the specific gravity of oil, $h$ is equal to the height between tank connections 58, 59 in feet, $x$ is equal to the distance in feet between the mercury level in the probe tube 70 and the lower connection 59 of the tank 5, and, Z is equal to the difference in mercury 64 level in inches.

The pressure acting on the left-hand side of the manometer system 54 (as viewed in FIG. 3) at the same reference level 71, is equal to $$\frac{ZS_m}{12}+S_0 L+P_2-S_0(X+L) \qquad (2)$$

where:

$S_m$ is equal to the specific gravity of the mercury 64,

L is the distance in feet between the mercury level in the probe tube 70 and the upper extremity of the inverted U-shaped connection 68a, $P_2$ is the total pressure exerted by the $SF_6$ gas and liquid at the lower end of the casing 5 on the neoprene diaphragm 82.

Since the pressures exerted upon the mercury at the two equal reference levels 71 are equal, and since $$P_2 = S_L h_L + S_g h_g$$

where $S_L$=Specific gravity of $SF_6$ (liquid), $S_g$ = Specific gravity of SF$_6$ (gas),
$h_L$ = height of liquid SF$_6$ in feet,
$h_g$ = height of gaseous SF$_6$ in feet, the foregoing Expressions (1), (2) may be equated to result in:

$$S_0 h - S_0 X + S_0 \frac{Z}{12} = \frac{Z S_m}{12} + S_0 L + S_L h_L + S_g h_g - S_0 X - S_0 L$$

from whence follows $$Z = \frac{S_0 h - (S_L h_L + S_g h_g)}{S_m - S_0} \times 12$$

Using the relationships given above, a typical calculation is presented below. Assuming the connections 58, 59 to the breaker tank 5 are three feet apart. Assume further, that the height of the liquid SF$_6$ is one foot, and the remaining height is gaseous SF$_6$.

Specific gravities are:

Mercury = 13.6 = $S_m$
Oil = 0.8 = $S_0$
SF$_6$ (liquid) = 1.3 = $S_L$
SF$_6$ (gas) = 0.3 = $S_{g1}$ (300 to 400 p.s.i.)
SF$_6$ (gas) = 0.006 = $S_{g2}$ (1 atmosphere)

Assume a leak has developed, and the SF$_6$ reduces to zero liquid level in the tank:
Normal condtion:

$$Z_n = \frac{(S_L - S_{g1}) h_L (S_{g1} - S_0) h}{S_m - S_0} \times 12$$

$$Z_n = \frac{(1.3 - .3) \times 1 + (.3 - .8) \times 3}{13.6 - .8} \times 12$$

$Z_n = 0.47$ inch

Abnormal condition where liquid level approaches zero:

$$Z_a = \frac{(1.3 - .3) \times 0 + (.3 - .8) \times 3}{13.6 - .8} \times 12$$

$Z_a = 1.41$ inches

Abnormal condition where SF$_6$ leaks down to 1 atmosphere:

Specific gravity of SF$_6$ gas reduces from 0.3 to .006

$$Z_a = \frac{(1.3 - .006) \times 0 + (.006 - .8) \times 3}{13.6 - .8} \times 12$$

$Z_a = 2.24$ inches

The table below gives values of Z for different levels $h_L$ of liquid SF$_6$:

| Level $h_L$ in feet: | Z in inches |
|---|---|
| 1.0 (reference) | .47 |
| 0.75 | .70 |
| 0.5 | .94 |
| 0.25 | 1.18 |
| 0 | 1.41 |
| 0 (1 atmosphere) | 2.24 |

The above calculations were based on 25° C. temperature. As the temperature increases, the liquid SF$_6$ changes into gas. However, the density of the gas increases, and the specific gravity of the gas increases, so that the disclosed system 54 monitors quantity of SF$_6$ rather than liquid SF$_6$ level.

If the area of the mercury well 73 is 100 times the area of the probe tube 68, Z equals the total displacement with respect to the probe 66 minus 1 percent.

From the foregoing description of the invention, it will be apparent that there is provided an improved manometer system 54 for a circuit interrupter of the type using an arc-extinguishing fluid in both the liquid and gaseous phases. The manometer system 54 is arranged to trip the breaker 1 open, or to initiate an alarm circuit should the liquid level 49 fall below the desired level.

More specifically, if the liquid level 49 of the SF$_6$ falls too low, the mercury level 75 will engage the probe 66, thereby completing the tripping circuit 67. The battery 76 will energize the winding 77 of the relay 78, thereby raising the armature 79 and causing the bridging contact 80 to bridge the contacts 81 of the tripping circuit 55.

As well known by those skilled in the art, the tripping circuit 55, when energized, will serve to trip the mechanism 2 of the circuit interrupter 1, or, in the alternative, ring a bell or sounding device.

The manual screw adjustment, provided by the probe 66, permits the tripping circuit 55 to be varied according to the conditions desired.

Although there has been illustrated and described a specific structure, it is to be clearly understood that the same was merely for the purpose of illustration, and that changes and modifications may readily be made therein by those skilled in the art, without departing from the spirit and scope of the invention.

We claim as our invention:

1. In combination, a fluid-flow sulfur-hexafluoride (SF$_6$) type of circuit interrupter having separable contacts for drawing an arc, and fluid-flow means for extinguishing said arc, and further having the sulfur-hexafluoride (SF$_6$) fluid in both the liquid and gaseous phases, a liquid-level-detection monitory system having manometric tubing, means for preventing the corrosive effect of the sulfur-hexafluoride (SF$_6$) fluid upon the manometric tubing including pressure-transmitting insulating control liquid connections to spaced points on said interrupter, said manometric tubing interconnecting said connections, an insulating control liquid within said manometric tubing and connections for transmitting pressure and avoiding contact of the sulfur hexafluoride fluid within such manometric tubing, the control liquid in said liquid connections and tubing being insulating and different from the sulfur-hexafluoride (SF$_6$) fluid, partition means associated with both said connections for preventing intercommunication between the sulfur-hexafluoride (SF$_6$) fluid and the insulating control liquid yet transmitting the pressure therebetween, a U-shaped portion of said manometric tubing having mercury therein making contact with the control liquid, an adjustable probe associated with said U-shaped portion, and relay-detection means having said adjustable probe as a portion thereof.

2. The combination of claim 1, wherein the insulating control liquid is oil.

3. The combination of claim 1, wherein the partition means includes resilient diaphragm members composed of a suitable resilient material.

4. The combination of claim 1, wherein valves are positioned in the manometric tubing on the opposite side of the liquid connections from the sulfur hexafluoride (SF$_6$) fluid for servicing and for throttling pressure surges during fault interruption.

References Cited in the file of this patent

UNITED STATES PATENTS

| | | |
|---|---|---|
| 1,916,427 | Korver | July 4, 1933 |
| 2,232,840 | Claffey | Feb. 25, 1941 |
| 2,398,375 | Heenan | Apr. 16, 1946 |